United States Patent [19]

Tomoda et al.

[11] 4,133,927

[45] Jan. 9, 1979

[54] COMPOSITE MATERIAL MADE OF RUBBER ELASTOMER AND POLYTETRAFLUOROETHYLENE RESIN

[75] Inventors: Masayasu Tomoda, Takatsuki; Yutaka Ueta, Ibaraki, both of Japan

[73] Assignee: Kaikin Kogyo Co., Ltd., Osaka, Japan

[21] Appl. No.: 733,124

[22] Filed: Oct. 18, 1976

[30] Foreign Application Priority Data

Oct. 23, 1975 [JP] Japan .................................. 50/127940

[51] Int. Cl.² ........................ B32B 27/04; B32B 7/10; B32B 7/00
[52] U.S. Cl. .................................... 428/215; 428/220; 428/281; 428/290; 428/291; 428/261; 428/262; 428/289; 428/305; 428/315; 428/331; 428/421; 428/422; 428/446; 428/538; 428/492; 428/519; 428/520; 162/172; 162/157 R; 526/255; 156/242; 29/156.6
[58] Field of Search .................. 162/172 R; 526/255; 428/422, 421, 446, 538, 281, 290, 215, 220, 519, 520, 492, 261, 262, 305, 289, 315, 291, 331

[56] References Cited

U.S. PATENT DOCUMENTS

| | | | |
|---|---|---|---|
| 2,533,501 | 12/1950 | Pendleton et al. | 428/421 X |
| 2,951,721 | 9/1960 | Asp | 288/16 |
| 3,015,604 | 1/1962 | Hochberg | 162/157 R |
| 3,170,811 | 2/1965 | Sands | 428/421 |
| 3,411,965 | 11/1968 | Hobaica | 428/422 |
| 3,579,370 | 5/1971 | Punderson et al. | 428/422 |
| 3,626,517 | 12/1971 | Kurtz | 428/421 X |
| 3,679,614 | 7/1972 | Shah et al. | 428/421 X |
| 3,801,552 | 4/1974 | Kometani et al. | 526/255 X |

FOREIGN PATENT DOCUMENTS 1355373 6/1974 United Kingdom.

*Primary Examiner*—P. C. Ives
*Attorney, Agent, or Firm*—Lane, Aitken, Dunner & Ziems

[57] ABSTRACT

A composite material including a rubber elastomer substrate and a polytetrafluoroethylene resin film or sheet having a porosity of 20 to 95% by volume and being laminated on at least one portion of the rubber elastomer substrate. In one preferred embodiment, a process for the production of the composite material includes the step of laminating a vulcanizable rubber elastomer with a porous film or sheet of polytetrafluoroethyle resin at a temperature and pressure sufficient to effect vulcanization of the rubber elastomer.

11 Claims, No Drawings of time sufficient to effect vulcanization of the vulcanizable rubber elastomer. (term "rubber elastomer" used herein is intended to mean vulcanized rubber elastomer.)

It is, accordingly, an object of the present invention to provide a rubber elastomer composite material having non-stickiness, low frictional resistance and good resistance to chemicals.

Another object of the present invention is to provide a rubber elastomer composite material useful as packings, O-rings, gaskets, belts, valves, diaphragms and the like.

A further object of this invention is to provide a process for producing a composite material made of rubber elastomer and PTFE where a strong adhesion of between PTFE film and the rubber elastomer is attained.

DETAILED DESCRIPTION OF THE INVENTION

The rubber elastomer used in the present invention may be any natural rubbers and synthetic rubbers such as a butadienestyrene rubber, a butyryl rubber, a nitrile rubber, a fluorine containing rubber, a chloroprene rubber, a urethane rubber, a silicon rubber and the like. These rubbers generally have elasticity of $10^6 - 10^7$ dyn/cm$^2$.

The PTFE porous film or sheet useful in the present invention may have continuous pores with a porosity of 20 – 95% (by volume herein and whenever it appears hereinlater). For example, the sheets or films of PTFE may be as follows.

(1) PTFE paper

Typical of the PTFE paper is a flexible non-woven paper-like or board-like sheet, as described, for example, in U.S. Pat. No. 3,003,912 or Japanese Patent Publication No. 5244/1967, which is obtained by dispersing fibrous powder of PTFE in a liquid medium, filtering the resulting dispersion so as to form a web, drying the web and sintering the dried web at a temperature above the melting point of PTFE, i.e., 327° C and which has a porosity of 40 – 90% and an average pore size of 5 – 20 μ, or the above-mentioned paper-like or board-like sheet which is compressed, as described in Japanese Patent Publication No. 1324/1971, to lower the porosity and the average pore size (e.g., a porosity of 20 – 50% and an average pore size of 0.5 – 6 μ). For the purpose of the invention, this PTFE paper is most preferable from the standpoint of production process since it can be readily laminated on a rubber substrate by application of pressure alone and also from the fact that the surface of the resulting composite material is smooth with a certain degree of hardness.

(2) Unsintered PTFE Tape

A flexible porous sheet with a relatively smooth surface obtained by mixing, with a lubricating oil, fine powder of PTFE obtained by an emulsion polymerization of tetrafluoroethylene, subjecting the mixture to a paste extrusion, and roll pressing the extruded material. This sheet has a fine average pore size of 0.2 – 5.0 μ and an apparent density of about 1.2 to 1.7 g/cm$^3$. The sheet is disclosed in U.S. Pat. No. 3,002,770 and is generally called an unsintered PTFE tape and is widely used as a sealing material for a threaded joint. Further, U.S. Pat. No. 3,664,915, West German OLS No. 2,123,316 and Japanese Patent Publication No. 13560/1967 describe a tape having a decreased density of 0.05 to 1.6 which is obtained by uniaxially stretching the unsintered tape without reducing its width, or, preferably by sintering the above stretched tape at a temperature above the melting point of the PTFE while keeping the porosity as it is (i.e., without breaking the pores). These tapes having a porosity of 25 – 95% by volume and an average pore size of 0.2 – 5.0 μ may also be used for the purpose of the invention.

(3) PTFE Woven Fabric

Cloth woven of PTFE fiber.

(4) PTFE Felt

Felt produced from PTFE fiber. For the purpose of the invention, the felt is preferred to be as thin as possible.

(5) Film obtained by skiving PTFE foam

The PTFE porous film or sheet may be composed of the PTFE alone or may further contain powder of inorganic substances such as titanium oxide, silica, glass, etc., and/or synthetic resin powder such as a tetrafluoroethylene-hexafluoropropylene copolymer and an ethylene-tetrafluoroethylene copolymer. Though the thickness of the PTFE porous sheet or film is not critical and may vary depending on the purpose in end use of the composite material, it is generally in the range of between 0.05 and 5 mm, preferably below 3 mm. If the thickness is above the above-defined range, the resulting composite material will lack flexibility.

In broad aspects, the lamination of the PTFE porous film or sheet on a rubber elastomer substrate is feasible by the following three methods:

(A) Method wherein a PTFE porous film or sheet is laminated on a rubber elastomer substrate by mere application of pressure;
(B) Method wherein lamination of a PTFE porous film or sheet on a rubber elastomer substrate is carried out with the use of an adhesive agent; and
(C) Method wherein lamination of a rubber elastomer substrate with a PTFE porous film or sheet is carried out by applying on the surface of the PTFE film or sheet a solution of the rubber elastomer.

In the method (A), heat may be also applied in addition to pressure. In the methods (B) and (C), the adhesion may be effected by application of heat and pressure.

The method (A) is preferable due to simplicity in operation. The most suitable PTFE porous material to be applied to the method (A) is the PTFE paper, since, as mentioned hereinbefore, the PTFE paper can satisfactorily be adhered to a rubber substrate by mere application of pressure. The very flexible PTFE paper can be laminated on any shape of the rubber substrate by the method (A).

The method (B) is particularly effective in the following respect in addition to enhancement of adhesiveness by the use of an adhesive. That is, when the composite material is employed in a liquid medium capable of attacking the rubber elastomer material, the medium will readily come in contact with the rubber elastomer substrate through the pores of the PTFE porous material and attack it, with the composite material obtained by the method (A). On the other hand, the composite material obtained by the method (B) has an advantage that when an adhesive which has a resistance to the medium is used for the lamination, the applied adhesive clogs the pores of the PTFE porous material and forms on the surface of the rubber elastomer substrate a layer imprevious to the medium, thus serving to protect the rubber elastomer substrate from being attacked. The disadvantage of the composite material resulting from

[4,133,927]

COMPOSITE MATERIAL MADE OF RUBBER ELASTOMER AND POLYTETRAFLUOROETHYLENE RESIN

BACKGROUND OF THE INVENTION

This invention relates to a rubber elastomer composite material having chemical inertness, non-stickiness and low frictional resistance and a process for the production thereof.

Rubber elastomers have been heretofore widely used in a variety of fields of the production of sealing materials, belts, valves, pumps and so on, but have a disadvantage in that they tend to become sticky when used for a long period of time, especially under pressure. For example, it is often observed that a bottle corked for a long period of time with a bottle stopper made of a rubber elastomer is hard to be uncorked, and when the stopper is forcibly pulled out, a part of the rubber is likely to stick and remain on the inner faces of the neck of the bottle. In another example, when a rubber elastomer applied as a valve member or diaphragm for a pump or valve is pressed against metal faces for a relatively long period of time, the valve member or diaphragm is hard to be separated immediately from the metal faces when the pressure is released. This results in a considerable delay in response rate of the pump or valve. Rubber elastomers have other drawbacks in that they have not sufficient resistances to chemicals and abrasion.

SUMMARY OF THE INVENTION

The present invention provides a composite material made of a rubber elastomer and a polytetrafluoroethylene resin and a process for the production thereof.

In order to overcome the afore-mentioned disadvantages inherently involved in rubber elastomers, we have made an extensive study of lamination of rubber elastomers with a sheet or film of a polytetrafluoroethylene resin (hereinafter referred to simply as PTFE) which is known as having excellent chemical inertness, non-stickiness and low frictional resistance. It has been found, however, that since PTFE films ordinarily available are sintered ones, they are poor in affinity for rubber elastomers due to their rigidity. Accordingly, the lamination can not be satisfactorily effected by mere application of pressure and, thus, the use of an adhesive is required. In this connection, however, the PTFE film generally lacks in its affinity for adhesives and strong adhesion could not be attained when the PTFE film is used as it is. Though the adhesion is much improved with the use of the PTFE film which has been subjected to a surface treatment with a specific type, the treated film still lacks in affinity, due to its high rigidity, for both a mold and a rubber elastomer in a molding step. As a result, wrinkles are apt to be produced on the film when a rubber elastomer having curved portions or complicated form is to be laminated with such PTFE film. Additionally, when a composite article having a rubber elastomer core surrounded by the PTFE film is produced, a seam of the PTFE film is undesirably left as it is. Thus, while a composite article having a simple form such as a sheet can be produced with the use of the PTFE film, it is not possible to obtain a composite article of complicated form with good quality. Further, even if the PTFE can be laminated on a rubber elastomer, the composite article can not be used as a member required to be moved, such as a diaphragm for a diaphragm pump, since the PTFE film is hard to deform correspondingly to the deformation of the rubber substrate due to the rigidity of the film. This results in wrinkles or separation of the film.

There is known a PTFE film chemically treated on the surface thereof to impart enhanced affinity for adhesives (e.g., "Nitoflon Tape," registered trade mark, manufactured by Nitto Electric Ind. Co.). This PTFE film has improved adhesiveness, but has still fair rigidity, so that the above problems involved in the usual PTFE films can not be solved. In addition, the chemically treated layer of the PTFE film loses its adhesion effect when exposed to ultraviolet rays and, therefore, when the PTFE film is exposed to sunlight over a long period of time, the adhesiveness will disadvantageously decrease.

In order to overcome the above disadvantages, we have made a further study and found that an excellent rubber elastomer composite material is obtainable by laminating a porous sheet or film of PTFE on the surface or surfaces of a rubber elastomer substrate.

The composite material of the present invention includes a PTFE surface layer and a rubber elastomer substrate and is thus imparted with the excellent properties of the PTFE such as non-stickiness and the like and also with rubber elasticity. That is, the composite material has the following excellent properties:

(1) Chemical inertness, non-stickiness and low frictional resistance derived from the PTFE surface layer;
(2) Good resistance to creep since a rubber elastomer is used as the substrate;
(3) Improved adhesiveness between the substrate layer and the PTFE surface layer, since the PTFE surface layer is in a form of porous sheet or film; and
(4) High resistances to heat and corrosion in both the surface and the inside thereof, and improved adhesiveness therebetween when a fluorine-containing rubber is used as the substrate.

The composite material of the invention can solve all the problems which have been encountered with the prior counterparts using ordinary PTFE films:

(1) The PTFE porous sheet or film can be laminated on a rubber elastomer substrate by all manners of lamination including application of pressure alone;
(2) Since the PTFE porous material has an excellent affinity for a mold and a rubber elastomer because of small rigidity and high flexibility, moldings or laminates in various forms can be easily produced;
(3) Where the entire external surface of a rubber elastomer substrate is laminated with a PTFE porous material, the seam of the PTFE porous material is hardly conspicuously seen and, thus, a molded composite article of good appearance is obtainable; and
(4) Because of small rigidity and excellent flexibility of the PTFE porous material, even when a composite material using such PTFE porous material is employed under deforming conditions or applied in a portion requiring flexibility, the PTFE porous layer can follow closely deformation of the rubber substrate, neither production of wrinkles of the porous layer nor delamination taking place.

In one preferred aspect of the present invention, the process for the production of the composite article made of a rubber elastomer and a porous PTFE film or sheet includes the steps of providing a vulcanizable rubber elastomer and laminating the porous film or sheet on at least one surface of a vulcanizable rubber elastomer at a temperature and pressure and for a period the porosity of the covering PTFE porous material can be overcome by the method (B). In the method (B), the adhesive is applied one or both of the rubber elastomer substrate and the PTFE porous material. It should be noted that deposition of a large amount of the applied adhesive on the surfaces of the laminated PTFE porous material by being oozed through a number of pores considerably impairs the favorable properties of the composite material of the invention, so that it is desired to prevent the adhesive from being deposited on the surfaces of the laminated PTFE porous material. Though any types of adhesives for rubber may be used in the method (B), synthetic rubber adhesives or epoxy adhesives are most preferred.

The method (C) is advantageous in much more enhancing an adhesion between the PTFE porous material and the rubber elastomer substrate. The adhesion by the method (A) takes place only between the surface layers. With the method (C), the adhesion takes place as follows: the PTFE porous material is applied with an adhesive of the same quality as the rubber elastomer substrate to fill the pores of the porous material therewith and the thus applied rubber adhesive is combined with the rubber substrate by adhesion, the adhesion between the porous material and the rubber substrate being improved so much. In the case, as in case of the method (B), it is desired that the rubber adhesive be prevented from being oozed through the pores, since the deposition of large amount of the rubber adhesive on the PTFE material surfaces impairs the advantageous properties of the composite material of the invention. In order to prevent such deposition, it will suffice to apply a rubber solution onto only one surface of a relatively thick PTFE porous material, or to entirely impregnate a PTFE porous material with a rubber solution and put a non-impregnated PTFE material on the impregnated material.

In a preferred embodiment of the invention, a vulcanizable rubber elastomer for vulcanization is used as the substrate and is combined with a PTFE porous material under pressure. Then, the combined substrate is treated under heating and pressing conditions so that the vulcanization of the vulcanizable rubber elastomer and the adhesion of the rubber elastomer substrate and the PTFE porous material occur at the same time. This lamination method has a number of advantages. One of them is that the operation is very simple. Another advantage is that, in the composite material produced by this method, part of the PTFE porous material is embedded in the rubber substrate, ensuring very strong adhesion. A further advantage resides in that since any materials such as adhesive other than the rubber substrate and the PTFE porous material are not used, the resulting composite material has no weakness from a chemical point of view. In this method, the heating and pressing operations may be advantageously conducted in a mold so as to facilitate the vulcanization at the same time. It is suited that the heating and pressing conditions be equal to the vulcanizing conditions generally employed for the rubber material used. This vulcanization and lamination procedure is applicable not only to the method (A), but also to the methods (B) and (C).

When the production of the composite material of the present invention is effected by application of pressure, it is desired that the thickness of the PTFE porous material be properly selected since the PTFE porous layer thickness is decreased by the pressure. Upon the lamination by application of pressure, the outer surface of the laminated PTFE porous material becomes more smooth than the original one.

The composite material of the present invention which is a laminate comprised of a rubber elastomer substrate and a PTFE porous material formed on the surface or surfaces of the rubber elastomer substrate, can overcome the disadvantages of the known rubber elastomer materials which tend to be turned sticky as time lapses. Further, the composite material of the invention can stand use even under corrosive circumstances under which the known rubber elastomer materials would be impossible to be used. In addition, the composite material has utility in the fields requiring low frictional resistance. Especially when a fluorine-contained rubber is used as the rubber elastomer, the resulting composite material will exhibit chemically, thermally and mechanically excellent properties. Thus, the composite materials of the invention have wide applications in the fields of sealing materials such as of gaskets, packings, O-rings, etc., and of heat-resistant belts, diaphragms, valves such as butterfly valve, etc.

The present invention will be particularly described by way of the following examples and comparative examples.

EXAMPLE 1

Two sheets of PTFE paper ["Polyflon (trade mark) Paper" PA-5A, produced by Daikin Kogyo Co., Ltd.] having a thickness of 0.55 mm, a porosity of 75%, a maximum pore diameter of 45 $\mu$ and a fluorine-containing rubber ["Dai-el" (trade mark) G-701 (containing a vulcanizing agent) produced by Daikin Kogyo Co., Ltd.] were placed in a thin dish-like mold having a cavity of 150 mm × 130 mm × 2 mm in such a manner that the fluorine-containing rubber material was sandwiched between the PTFE paper sheets, which was then allowed to stand at a temperature of 170° C under a pressure of 35 kg/cm$^2$G for 15 min to form a laminate.

The pores in the surfaces of the paper sheets contacting the rubber material were partially filled with rubber material and, consequently, the PTFE paper sheets were each strongly adhered to the fluorine-containing rubber. The resulting laminate had smooth surfaces, that is, the roughness of the original PTFE paper sheet was almost completely lost and the laminate had a sliding tendency as good as a molded article of a PTFE. When the laminate was bent to an angle of 90°, no wrinkles were produced at the bent portion.

COMPARATIVE EXAMPLE 1

Example 1 was repeated using, instead of the PTFE paper, sintered PTFE films with a thickness of 0.3 mm. The PTFE films did not strongly adhere to the fluorined rubber and could be easily separated by fingers.

EXAMPLE 2

Example 1 was repeated using, instead of the fluorine-containing rubber material, a natural rubber for vulcanization containing a vulcanizing agent.

The resulting laminate had, similarly to Example 1, smooth PTFE surfaces with a loss of the roughness of the PTFE paper and was thus imparted with a good sliding tendency on the surfaces thereof. In addition, the laminate was found to be more flexible than that of Example 1 since the natural rubber was used.

EXAMPLE 3

A fluorine-containing rubber material for vulcanization (Dai-el 501 produced by Daikin Kogyo Co., Ltd.) was dissolved in an acetone-methyl ethyl ketone mixed solvent (in a volume ratio 3:7) to have a solid content of 30% by weight. The resulting rubber solution was coated onto both surfaces of the same kind of the PTFE paper sheet as used in Example 1 and dried. The above procedure was repeated three times in total to obtain a rubber-impregnated PTFE paper sheet.

A lay-up of a fluorine-containing rubber material, the rubber-impregnated PTFE paper sheet and a non-impregnated PTFE paper sheet superimposed in this order was placed in the same mold as used in Example 1 and then treated under the same heating and pressing conditions as in Example 1 to obtain a laminate.

In the thus obtained laminate, the non-impregnated PTFE paper sheet was strongly adhered to the rubber-impregnated PTFE paper sheet and could not easily be separated by fingers. The non-impregnated PTFE paper sheet was smooth on the outer surface thereof, giving a good sliding tendency. The rubber-impregnated PTFE paper sheet and the fluorine-contained rubber were completely combined together.

EXAMPLE 4

A PTFE paper sheet and a fluorine-containing rubber material both of the same kinds as used in Example 1 were used to make an O-ring by covering the rubber material in an O form with two PTFE paper sheets from the upper and lower sides thereof.

That is, two PTFE paper sheets and the fluorine-contained rubber material for vulcanization were properly shaped, respectively, so as to make an O-ring by the use of an O-ring mold having a groove diameter of 5.6 mm and a grooved ring diameter of 121.2 mm. One of the PTFE paper sheets was put on the bottom of the groove of the mold which had been previously heated, on which the shaped unvulcanized fluorine-containing rubber material was set, followed by covering the rubber material from the above with another sheet of the PTFE paper. The mold was then closed and maintained under conditions of a temperature of 170° C and a pressure of 35 kg/cm$^2$G for 15 min.

The rough surface of the PTFE paper was flattened and the resulting O-ring had a smooth outer surface, giving a good sliding tendency. When the O-ring was subjected to a 90° bending test as in Example 1, no wrinkles were observed. The O-ring had not hard touch feeling since the softness inherent to the rubber was retained.

EXAMPLE 5

A PTFE paper sheet was coated on one face thereof with a mixture of 100 parts by weight of an epoxy resin adhesive (principally composed of Epotac AD-45 produced by Japan Bellnox Co.) and 50 parts by weight of a curing agent (Bell Cure HQ-IW produced by Japan Bellnox Co.) to obtain an adhesive-coated PTFE paper sheet. Then, Example 4 was repeated except that the thus obtained sheet was used and the adhesive layer faced the fluorine-contained rubber material, thereby obtaining an O-ring.

In the thus obtained O-ring, the adhesive was locally slightly deposited on the PTFE surface layer, but the sliding tendency of the PTFE surface layer was almost the same as in the case of Example 4. The PTFE surface layer was reinforced and increased in hardness when compared with that of Example 4 by a degree reinforced with the adhesive layer.

EXAMPLE 6

Example 5 was repeated using, instead of the PTFE paper, a porous PTFE Tape with a thickness of 0.080 - 0.082 mm, a density of about 0.3 and an average pore diameter of about 0.2 μ which has been obtained by stretching an unsintered PTFE tape produced by paste-extruding PTFE fine powder followed by calendering, thereby obtaining an O-ring.

The PTFE surface layer of the thus obtained O-ring had a satisfactory sliding tendency, but the O-ring was slightly harder and higher in mechanical strengths than that obtained in Example 5.

COMPARATIVE EXAMPLE 2

Example 5 was repeated using, instead of the PTFE paper, a Nitoflon tape of a thickness of 0.1 mm which is a sintered PTFE tape with one surface chemically etched in order to impart affinity with adhesives thereto, thereby obtaining an O-ring.

The thus obtained laminate exhibited a good adhesion between the nitoflon tape surface layer and the rubber layer. But, as a result of the 90° bending test as show in Example 1, a whitening phenomenon was observed on the Nitoflon surface layer. Upon repeating the bending operation 10 - 20 times, wrinkles were produced locally, with the whitening being left. A number of wrinkles were centered at the seam portion of the Nitoflon tapes in the inner side of the O-ring. Further, the O-ring which was composed of the rubber core surrounded by the Nitoflon tapes with high rigidity had harder touch feeling than that obtained in Example 6.

We claim:

1. A composite material comprising a vulcanized rubber elastomer substrate laminated with a porous film or sheet of polytetrafluoroethylene resin wherein said porous resin film or sheet forms a layer having a thickness of between 0.05 mm and 5 mm on the surface of the elastomer substrate, said porous resin surface layer having a porosity of between 20 and 95% by volume, the pores of which are at least partially filled with vulcanized rubber elastomer, said composite material being obtained by superimposing said porous resin film or sheet on a vulcanizable rubber elastomer substrate and subjecting said superimposed elastomer substrate to heat and pressure sufficient to effect vulcanization of the rubber elastomer substrate and adhesion between the porous resin film or sheet and the elastomer substrate.

2. The composite material according to claim 1 wherein said porous film or sheet is selected from the group consisting of a polytetrafluoroethylene paper, an unsintered polytetrafluoroethylene tape, a woven polytetrafluoroethylene fabric, a polytetrafluoroethylene felt and a polytetrafluoroethylene form.

3. The composite material according to claim 1 wherein said porous film or sheet contains therein an inorganic powder selected from titanium oxide, silica and glass.

4. The composite material according to claim 1 wherein said porous film or sheet contains therein a synthetic resin.

5. The composite material according to claim 1 wherein the entire external surface of said substrate is laminated with said porous film or sheet.

6. A composite material comprising a vulcanized rubber elastomer substrate laminated with a porous film or sheet of polytetrafluoroethylene resin wherein said porous resin film or sheet forms a layer having a thickness of between 0.05 mm and 5 mm on the surface of the elastomer substrate, said porous resin surface layer having a porosity of between 20 and 95% by volume, the pores of which adjacent the substrate are at least partially filled with vulcanized rubber elastomer, said composite material being obtained by at least partially impregnating the pores of said porous resin film or sheet with an adhesive solution containing unvulcanized rubber elastomer, superimposing said porous resin film or sheet on said substrate and subjecting said superimposed elastomer substrate to heat and pressure sufficient to effect vulcanization of the rubber elastomer in said pores and adhesion between the porous resin film or sheet and the elastomer substrate.

7. The composite material according to claim 6 wherein the pores of said resin film or sheet are entirely impregnated with rubber elastomer and a second porous resin film or sheet is superimposed on the surface of said impregnated film or sheet opposite said substrate.

8. The composite material according to claim 6 wherein said porous film or sheet is selected from the group consisting of a polytetrafluoroethylene paper, an unsintered polytetrafluoroethylene tape, a woven polytetrafluoroethylene fabric, a polytetrafluoroethylene felt and a polytetrafluoroethylene foam.

9. The composite material according to claim 6 wherein said porous film or sheet contains therein an inorganic powder selected from titanium oxide, silica and glass.

10. The composite material according to claim 6 wherein said porous film or sheet contains therein a synthetic resin.

11. The composite material according to claim 6 wherein the entire external surface of said substrate is laminated with said porous film or sheet.

* * * * *

UNITED STATES PATENT AND TRADEMARK OFFICE
CERTIFICATE OF CORRECTION

PATENT NO. : 4,133,927

DATED : January 9, 1979

INVENTOR(S) : Masayasu Tomoda et al

It is certified that error appears in the above-identified patent and that said Letters Patent are hereby corrected as shown below:

On the cover page, the assignee should be --Daikin Kogyo Co., Ltd.--

Signed and Sealed this

Nineteenth Day of June 1979

[SEAL]

Attest:

RUTH C. MASON
Attesting Officer

DONALD W. BANNER
Commissioner of Patents and Trademarks